(12) United States Patent
Jiang et al.

(10) Patent No.: US 11,892,639 B2
(45) Date of Patent: Feb. 6, 2024

(54) DISPLAY DEVICE HAVING DISPLAY AREA WITH LUMINOUS PIXELS OVER CURVED SURFACE OF SEMICONDUCTOR SUBSTRATE FOR USE IN NEAR-EYE DISPLAY

(71) Applicant: Taiwan Semiconductor Manufacturing Company, Ltd., Hsinchu (TW)

(72) Inventors: Jheng-Hong Jiang, Hsinchu (TW); Shing-Huang Wu, Hsinchu (TW); Chia-Wei Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/881,126

(22) Filed: Aug. 4, 2022

(65) Prior Publication Data

US 2023/0043608 A1    Feb. 9, 2023

Related U.S. Application Data

(60) Provisional application No. 63/230,689, filed on Aug. 6, 2021.

(51) Int. Cl.
*G09G 3/30* (2006.01)
*G09G 3/36* (2006.01)
*G02B 27/01* (2006.01)
*G09F 9/33* (2006.01)
*G09F 9/30* (2006.01)

(52) U.S. Cl.
CPC ......... *G02B 27/0172* (2013.01); *G09F 9/301* (2013.01); *G09F 9/33* (2013.01)

(58) Field of Classification Search
CPC ........ G02B 27/0172; G09F 9/301; G09F 9/33
See application file for complete search history.

(56) References Cited

U.S. PATENT DOCUMENTS

| 2017/0367190 A1* | 12/2017 | Drzaic | G09G 3/20 |
| 2020/0214149 A1* | 7/2020 | Lee | H05K 5/0017 |
| 2022/0206537 A1* | 6/2022 | Park | G06F 3/044 |
| 2022/0263043 A1* | 8/2022 | Sunwoo | H10K 77/111 |

* cited by examiner

*Primary Examiner* — Sanghyuk Park
(74) *Attorney, Agent, or Firm* — Birch, Stewart, Kolasch & Birch, LLP

(57) ABSTRACT

A near-eye display includes a semiconductor substrate that has a first curved surface and a second curved surface opposite to each other, and a plurality of luminous pixels formed over the first curved surface of the semiconductor substrate. The luminous pixels cooperatively form a display area of the near-eye display. The second curved surface of the semiconductor substrate is formed with a plurality of indentations at a portion that corresponds in position to the display area.

20 Claims, 13 Drawing Sheets

(a)

(b)

(c)

DISPLAY DEVICE HAVING DISPLAY AREA WITH LUMINOUS PIXELS OVER CURVED SURFACE OF SEMICONDUCTOR SUBSTRATE FOR USE IN NEAR-EYE DISPLAY

PRIORITY CLAIM AND CROSS-REFERENCE

This application claims priority of U.S. Provisional Patent Application No. 63/230,689, filed on Aug. 6, 2021, all of which are hereby expressly incorporated by reference into the present application.

BACKGROUND

With the development of virtual reality (VR) and augmented reality (AR), demands for near-eye displays rise. Manufacturing near-eye displays with semiconductor technologies may fulfill requirements of high resolution and low power consumption.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
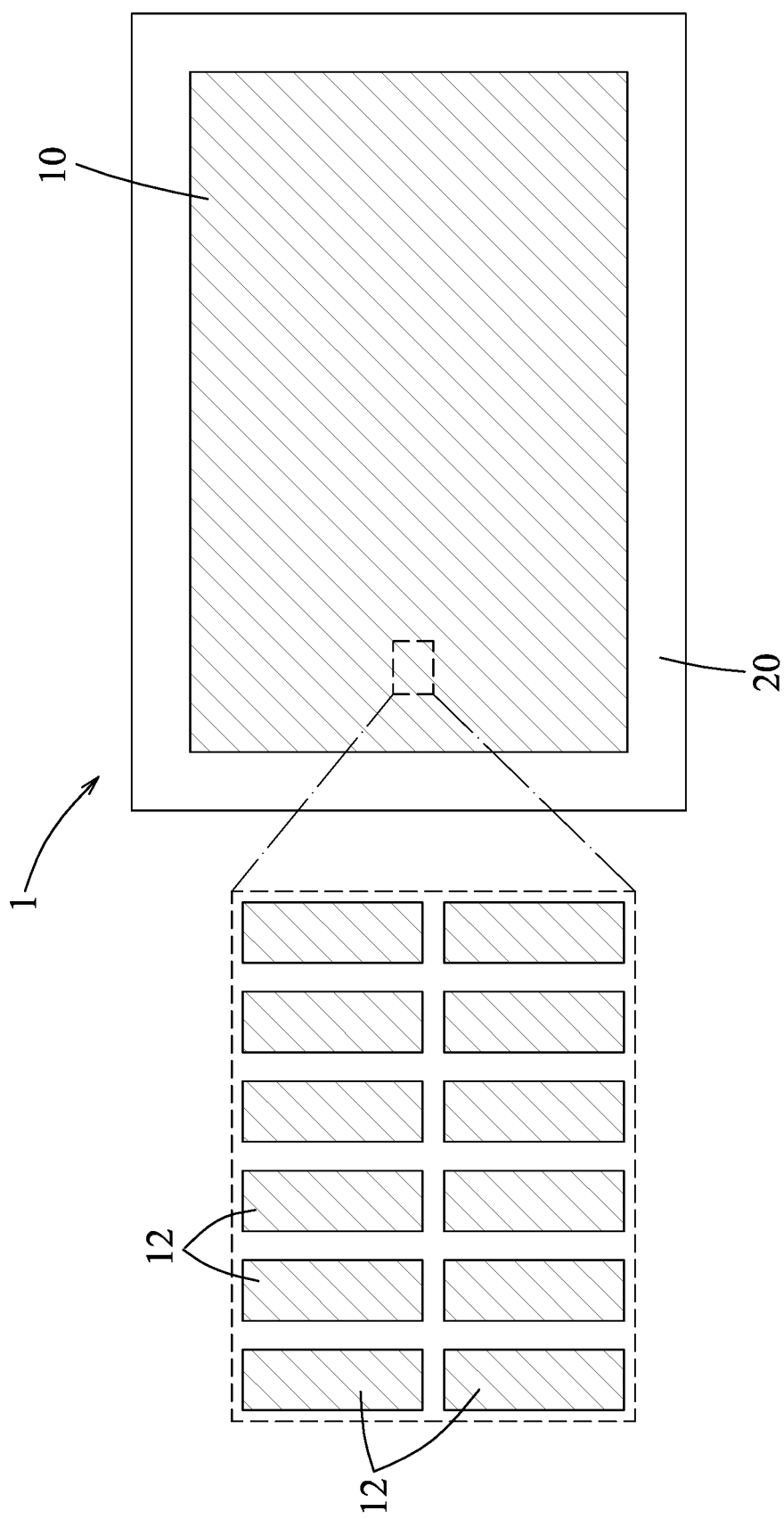
FIG. 1 is a schematic diagram that illustrates a display device for use in a near-eye display in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "above," "over," "downwardly," "upwardly," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Near-eye displays, also known as head-mounted displays (HMDs) or wearable displays, are commonly used in virtual reality (VR) and/or augmented reality (AR) applications, and are configured to display images in front of one or both of the eyeballs of a user by a small distance, which may range from about 10 mm to about 100 mm. Distances between near-eye displays and eyeballs are so close that the near-eye displays usually have a small size, such as having a width and a length each in a range from about 5 mm to about 150 mm.

FIG. 1 exemplarily illustrates a top view of a display device 1 for use in a near-eye display. The display device 1 includes a display area 10 (also referred to as luminous area or pixel area), and a peripheral circuit area 20 (also referred to as dark area) that surrounds the display area 10. In accordance with some embodiments, a plurality of luminous pixels 12 may be arranged in an array in the display area 10 to display images. The luminous pixels 12 may refer to self-luminous pixels or back-illuminated pixels or any other types of pixels that are configured to display images, and may be fabricated using, for example, a liquid crystal display (LCD) technology, a light-emitting diode (LED) technology, a mini LED technology, a micro LED technology, a quantum dot technology, an organic light-emitting diode (OLED) technology, other suitable display technologies, or any combination thereof. In accordance with some embodiments, the peripheral circuit area 20 may include, for example, gate driver circuits, source driver circuits, wire routing, other circuits that are configured to enable the luminous pixels 12 in the display area 10 to display images, or any combination thereof. In accordance with some embodiments, it may be that the peripheral circuit area 20 does not include circuits at every side of the display area 10, and the peripheral circuit area 20 may be configured to be circuit-less at one or more sides of the display area 10. In accordance with some embodiments, the display device 1 may be fabricated on a semiconductor wafer, so as to obtain better circuit performance and less power consumption in comparison to those fabricated on other types of substrates, such as glass substrates, plastic substrates, etc. In accordance with some embodiments, the peripheral circuit area 20 is minimized for reducing an overall area of the display device 1, so a number of the display devices 1 that can be fabricated on a single wafer can be maximized. In accordance with some embodiments, the peripheral circuit area 20 may occupy about 5% to about 50% of the area of the display device 1, which means that the display area 10 may occupy about 50% to about 95% of the area of the display device 1.

Figure 2:
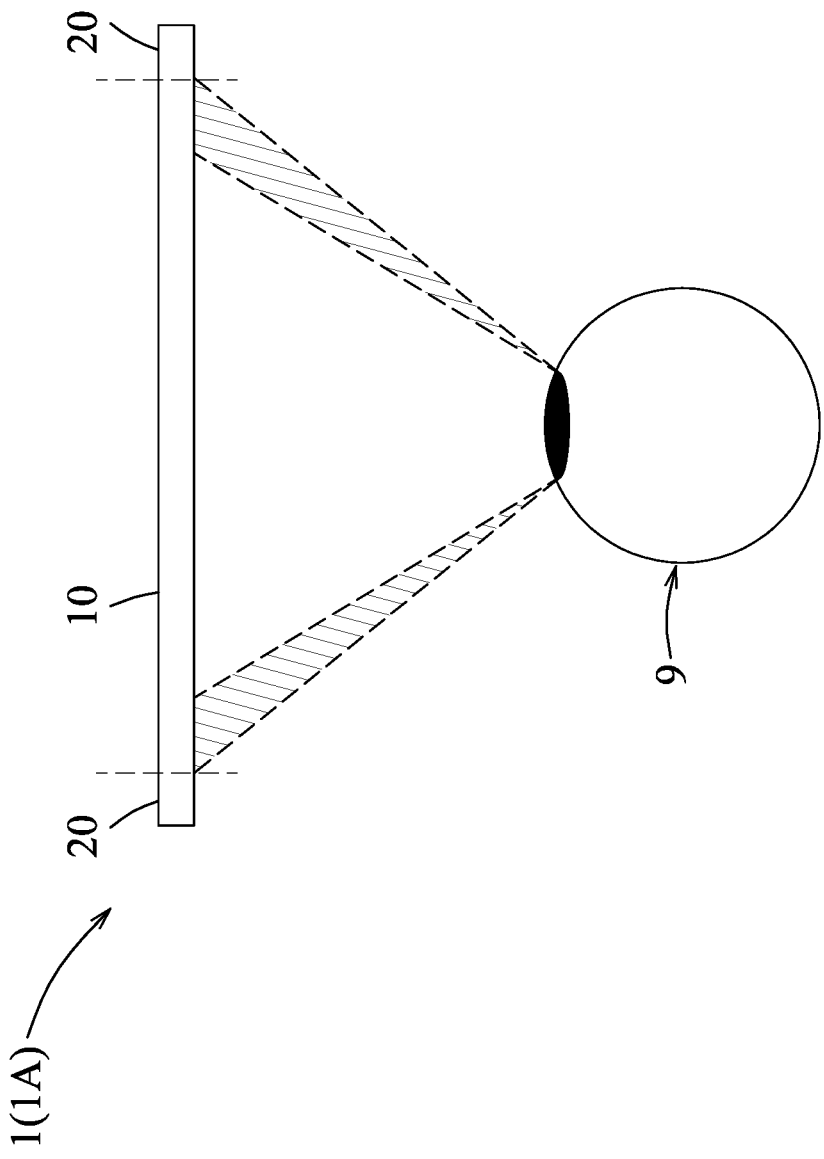
FIG. 2 is a schematic diagram that illustrates a scenario where a flat display device of a near-eye display is in use in accordance with some embodiments.
Figure 3:
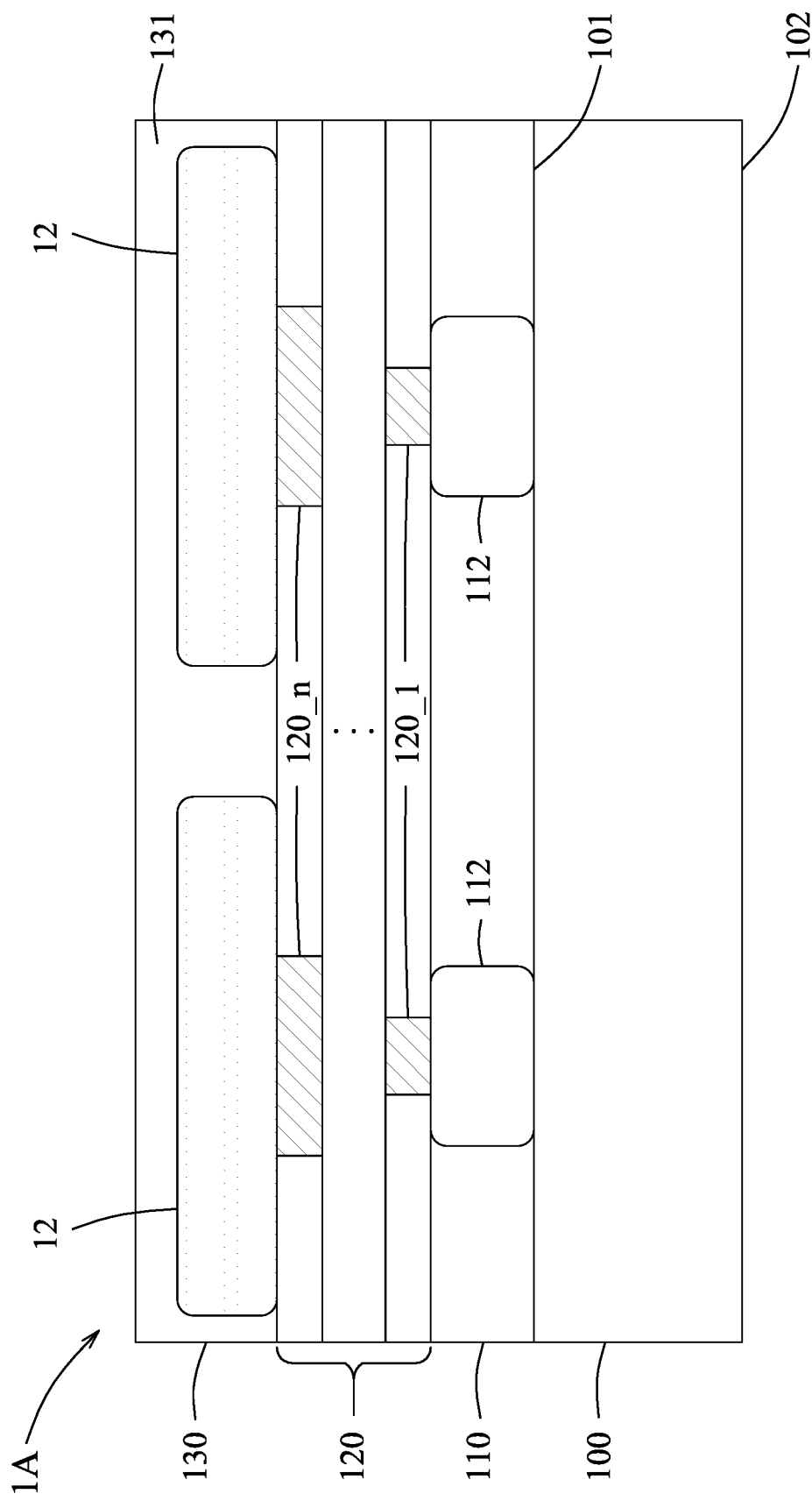
FIG. 3 is a sectional view of the flat display device in accordance with some embodiments.

FIG. 2 exemplarily illustrates a scenario where the display device 1 is a flat display device 1A and is configured to display images for an eyeball 9 in accordance with some embodiments. FIG. 3 exemplarily illustrates a simplified sectional structure of the display area 10 of the display device 1A. The display device 1A includes a substrate 100, a driving element section 110 formed over a frontside surface 101 of the substrate 100, an interconnection section 120 formed over the driving element section 110, and a luminous device section 130 formed over the interconnection section 120, where the luminous pixels 12 are formed in the luminous device section 130.

In the illustrative embodiment, the substrate 100 is a semiconductor substrate that may be a bulk semiconductor substrate or a semiconductor-on-insulator (SOI) substrate, which may be doped (e.g., with a p-type or an n-type dopant) or undoped. In some embodiments, an SOI substrate includes a layer of a semiconductor material formed on an insulator layer. The insulator layer may be a buried oxide (BOX) layer, a silicon oxide layer or any other suitable layer. The insulator layer may be provided on a suitable substrate, such as silicon, glass or the like. The substrate 100 may be made of a suitable semiconductor material, such as silicon or the like. In some embodiments, the substrate 100 is a silicon substrate; and in other embodiments, the substrate 100 is made of a compound semiconductor such as silicon carbide, gallium arsenide, indium arsenide, indium phosphide or other suitable materials. In still other embodiments, the substrate 100 is made of an alloy semiconductor such as GaAsP, AlInAs, AlGaAs, GaInAs, GaInP, GaInAsP or other suitable materials.

In some embodiments, the substrate 100 includes various p-type doped regions and/or n-type doped regions, such as p-type wells, n-type wells, p-type source/drain features and/or n-type source/drain features (source/drain feature(s) may refer to a source or a drain, individually or collectively depending upon the context), formed by a suitable process such as ion implantation, thermal diffusion, a combination thereof, or the like. In some embodiments, the substrate 100 may include other functional elements such as resistors, capacitors, diodes, transistors, and/or the like. The transistors are, for example, field effect transistors (FETs), such as planar FETs and/or 3D FETs (e.g., FinFETs, GAAFETs). The substrate 100 may include lateral isolation features (e.g., shallow trench isolation (STI)) configured to separate various functional elements formed on the substrate 100 and/or various functional elements formed in the substrate 100.

In the illustrative embodiment, the substrate 100 is opaque and is configured to allow images to travel directly toward the eyeball 9 (rather than projecting images onto a transparent object, such as a lens), so the display device 1A is suitable for VR applications. The driving element section 110 includes a plurality of pixel-driving components 112 that are electrically connected to the luminous pixels 12, and are configured to drive light emission of the luminous pixels 12. In accordance with some embodiments, each of the pixel-driving components 112 is electrically connected to a respective one of the luminous pixels 12, and may be a circuit that includes one or more transistors (not shown). In accordance with some embodiments, the transistors may be realized as planar transistors, FinFETs, GAAFETs, other suitable types of transistors, or any combination thereof. In accordance with some embodiments, each of the pixel-driving components 112 may include one or more passive components, such as capacitors, resistors, inductors, other suitable passive components, or any combination thereof. In accordance with some embodiments, the driving element section 110 may also include some circuits (e.g., the gate driver circuits, the source driver circuits, the wire routing, etc.) that are formed in the peripheral circuit area 20 (see FIG. 1).

The interconnection section 120 is configured to connect the pixel-driving components 112 of the driving element section 110 to the luminous pixels 12 of the luminous device section 130. In accordance with some embodiments, the interconnection section 120 may include one or more interconnection layers 120_1 to 120_n, each of which may include metal wires and metal vias that are formed in interlayer dielectrics. In accordance with some embodiments, the metal wires and the metal vias may include, for example, Ti, Ta, Cu, W, AlCu, AlSiCu, other suitable materials, or any combination thereof. In different interconnection layers, the metal wires and the metal vias may have different element compositions. For example, the metal wires and the metal vias may be AlSiCu with different compositions (e.g., different atomic ratios among Al, Si and Cu) in different interconnection layers. In accordance with some embodiments, the interlayer dielectrics may include, for example, silicon oxide, silicon oxynitride, fluorosilicate glass (FSG), phosphosilicate glass (PSG), silicon carbide, silicon nitride, low-k materials, or any combination thereof. The pixel-driving components 112 of the driving element section 110 are electrically connected to the luminous pixels 12 in the luminous device section 130 through the metal wires and the metal vias.

The luminous device section 130 includes the luminous pixels 12 formed therein, and the luminous pixels 12 cooperatively form the display area 10 (see FIG. 1). In accordance with some embodiments, the luminous device section 130 may further include an encapsulation layer 131 that is formed over and covers the luminous pixels 12. In a case that the luminous pixels 12 are fabricated using the OLED technology, each of the luminous pixels 12 may include an anode layer, a hole injection layer, a hole transporting layer, an emission material layer, an electron transporting layer, an electron injection layer, and a cathode layer that are stacked in the given order, where the anode layer is in contact with the top interconnection layer 120_n (when viewed from the perspective of FIG. 3). In accordance with some embodiments, the cathode layers of the luminous pixels 12 may be electrically connected to a common electrode (not shown) that is formed in the peripheral circuit area 20 (see FIG. 1).

Figure 4:
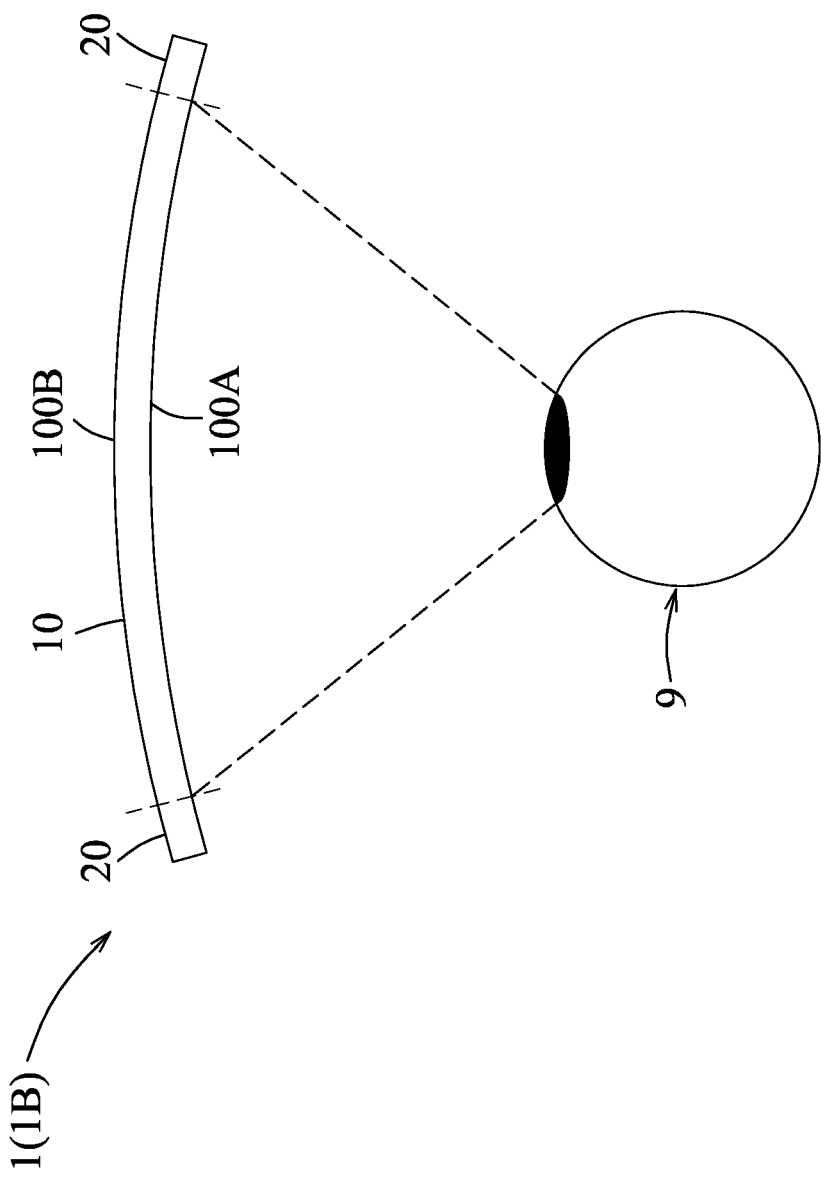
FIG. 4 is a schematic diagram that illustrates a scenario where a curved display device of a near-eye display is in use in accordance with some embodiments.

FIG. 4 exemplarily illustrates a variation of the display device 1 in accordance with some embodiments, where the display device 1 is a curved display device 1B that has a curved frontside surface 100A and a curved backside surface 100B opposite to each other. To be specific, from the perspective of the eyeball 9 of the user, the frontside surface 100A is a concave surface that faces the eyeball 9, and the backside surface 100B is a convex surface. Referring to FIG. 2, when the user views an image displayed by the flat display device 1A, since the eyeball 9 has a curved surface, the user may detect some distortions at an edge portion (represented by stripes in FIG. 2) of the image. On the other hand, the curved display device 1B as illustrated in FIG. 4 fits the shape of the eyeball 9 better, so the user may detect less distortions at the edge portion of the image when the image is displayed by the curved display device 1B, and the user may feel that the image presented by the curved display device 1B has better quality than the image presented by the flat display device 1A.

Figure 5:
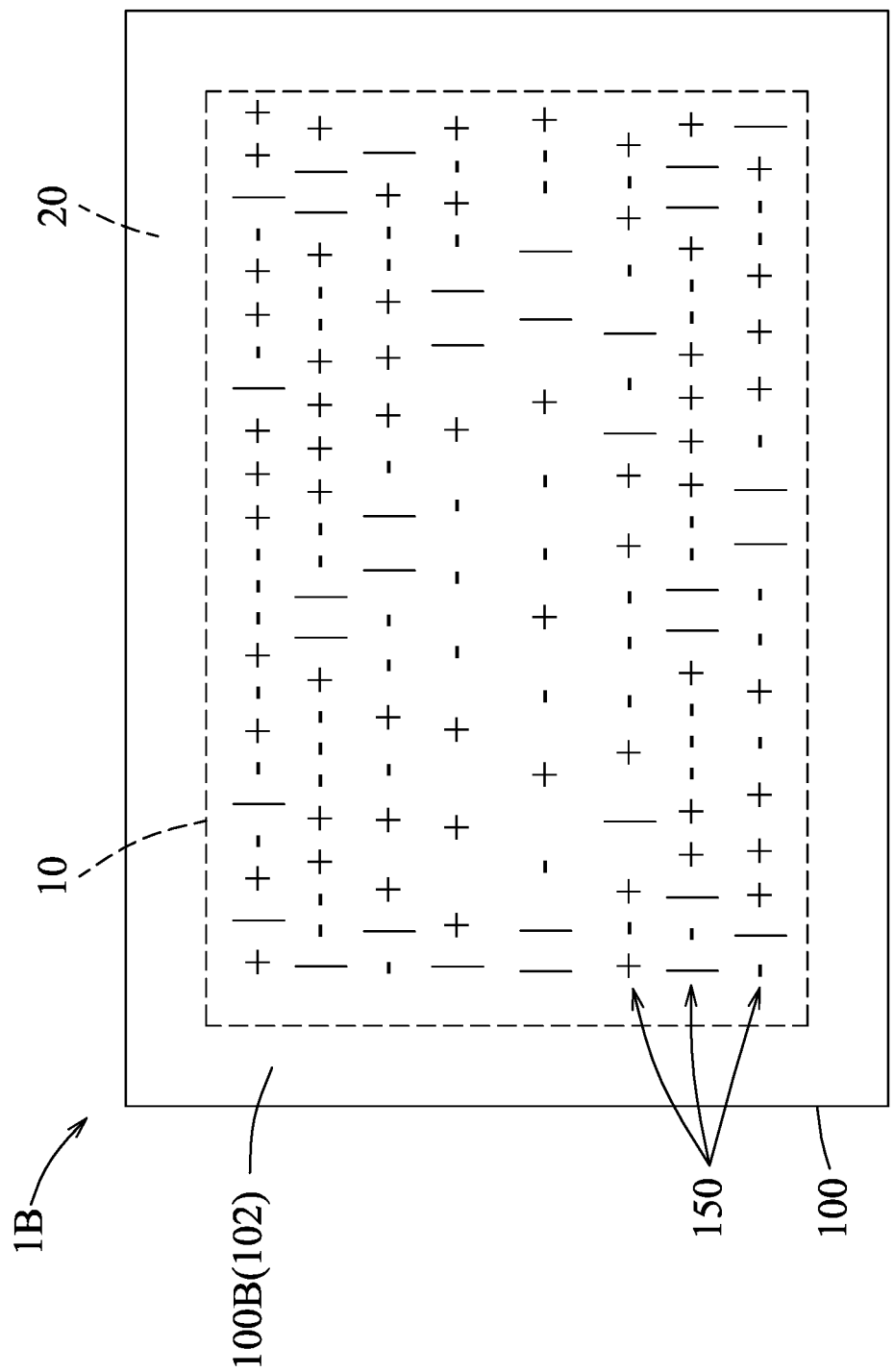
FIG. 5 is a schematic diagram that illustrates a backside surface of the curved display device formed with a plurality of indentations in accordance with some embodiments.

Referring to FIGS. 4 and 5, the backside surface 100B of the curved display device 1B is formed with a plurality of indentations 150 to create a desired curvature of the curved display device 1B. In accordance with some embodiments, the backside surface 100B of the curved display device 1B is a backside surface 102 of the substrate 100 that is opposite to the frontside surface 101 of the substrate 100. The indentations 150 may be formed in various shapes. Since the presence of excessive indentations 150 may unnecessarily reduce a mechanical strength of the substrate 100, in the illustrated embodiment, the indentations 150 are formed only in a portion of the backside surface 102 of the substrate 100 that corresponds in position to the display area 10 (or to a portion of the luminous device section 130 where the luminous pixels 12 are formed), so as to maximize the mechanical strength of the substrate 100 while the substrate 100 has the desired curvature, but this disclosure is not limited to such, and in some embodiments, the indentations 150 may also be formed in a portion of the backside surface 102 of the substrate 100 that corresponds in position to the peripheral circuit area 20. In accordance with some embodiments, the indentations 150 may be distributed in 10% to 80% of the overall area of the backside surface 102 of the substrate 100 to ensure a sufficient mechanical strength of the substrate 100 while achieving the desired curvature of the curved display device 1B. In the illustrative embodiment, a distribution density of those of the indentations 150 that correspond in position to an edge portion of the display area 10 is greater than a distribution density of those of the indentations 150 that correspond in position to a central portion of the display area 10 because the edge portion of the display area 10 may need a greater curvature to alleviate the image distortion that may occur at the edge portion, but this disclosure is not limited to such, and the distribution density of the indentations 150 may be designed based on specific product specifications in other embodiments.

Figure 6:
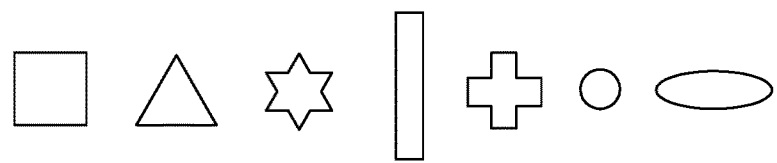
FIG. 6 provides some exemplary shapes for the indentations in accordance with some embodiments, and some exemplary arrangements for the indentations of different patterns in accordance with some embodiments.
Figure 6:
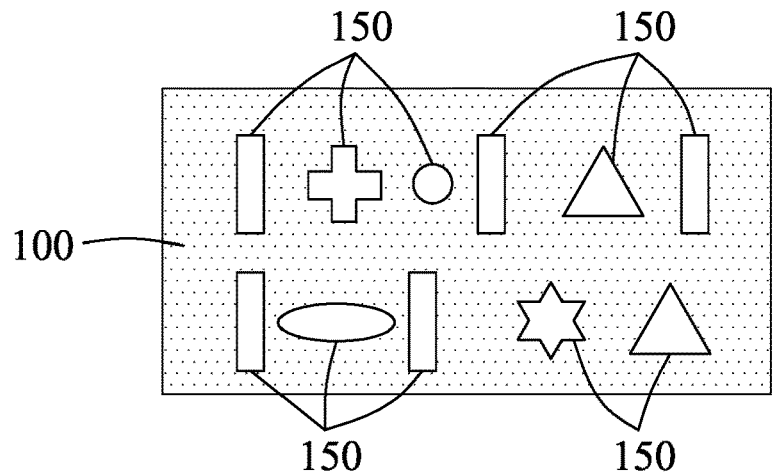
Figure 6:
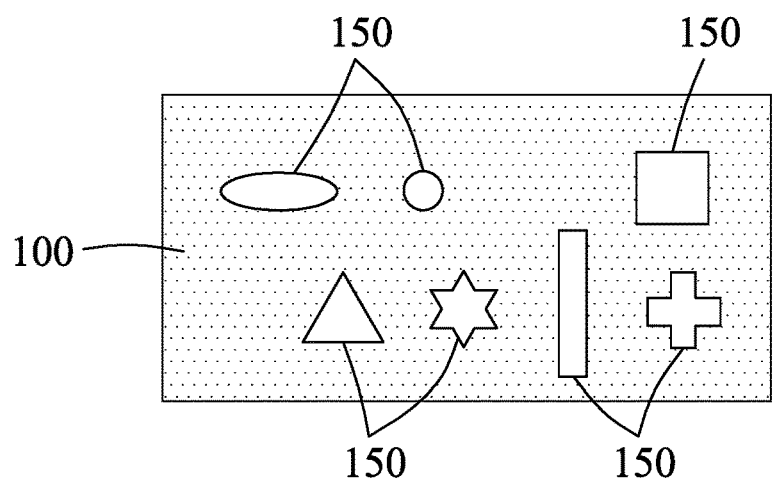

Referring to FIG. 6, part (a) provides some examples for the shapes of the indentations 150 in a top view. The examples include a square, a triangle, a hexagram, a stripe (or rectangle), a cross, a circle and an oval, but this disclosure is not limited to such. The indentations 150 may be formed in any shapes as desired by a designer. However, the most commonly-used shapes may be stripes and crosses. A stripe-shaped indentation may have a pair of short edges and a pair of long edges to form a narrow rectangle, and make the display device 1B bend toward a frontside direction (i.e., a direction that the frontside surface 100A of the display device 1B faces) from two sides separated by a longitudinal axis of the stripe-shaped indentation. Therefore, the stripe-shaped indentations can be used to adjust a curvature of the display device 1 with respect to a target direction, and to adjust uniformity in terms of distribution of stress applied to the substrate 100. In accordance with some embodiments, a stripe-shaped indentation may have a width in a range from about 3 μm to about 60 μm and a length in a range from about 3 μm to about 60 μm. An excessively large width/length of the stripe-shaped indentation (e.g., greater than 60 μm) may result in excessive bending toward a single direction, which may lead to poor uniformity in terms of stress distribution. Further, the excessively long or wide stripe-shaped indentation may also cause an insufficient structural strength of the substrate 100. An excessively small width/length of the stripe-shaped indentation (e.g., smaller than 3 μm) may lead to insufficient bending of the substrate 100, so the curved display device 1B may not have the desired curvature. A cross-shaped indentation may have a first stripe pattern and a second stripe pattern that intersect each other. Each of the first stripe pattern and the second stripe pattern is a stripe-shaped indentation that has a width in a range from about 3 μm to about 60 μm and a length in a range from about 3 μm to about 60 μm. Since the cross-shaped indentation have two stripe patterns that extend in different directions, the cross-shaped indentation may have better uniformity in terms of the stress distribution. In accordance with some embodiments, the first stripe pattern and the second stripe pattern of the cross-shaped indentation are perpendicular to each other, thereby achieving even better uniformity in terms of the stress distribution. In accordance with some embodiments, the first stripe pattern and the second stripe pattern of the cross-shaped indentation may have different lengths and/or widths, so as to adjust uniformity in terms of the stress distribution. In accordance with some embodiments, the first stripe pattern and the second stripe pattern of the cross-shaped indentation form a plus sign, where the intersection of the first stripe pattern and the second stripe pattern is located at both of the centers of the first stripe pattern and the second stripe pattern, thereby achieving even better uniformity in terms of the stress distribution.

In accordance with some embodiments, the indentations 150 can be arranged regularly in terms of shapes of the indentations 150 and/or distances among the indentations 150. That is, the arrangement of the shapes of the indentations 150 can be periodic, and the distances among the indentations 150 may be formulated (e.g., the indentations 150 may be arranged equidistantly or based on a predetermined rule). In FIG. 6, parts (b) and (c) illustrate that the arrangement of the indentations 150 can be irregular in terms of shapes of the indentations 150 and/or distances among the indentations 150. In other words, the arrangement of the shapes of the indentations 150 can be non-periodic, and the distances among the indentations 150 may vary and be non-formulated (not following any particular rule) in accordance with some embodiments. In accordance with some embodiments, the indentations 150 may be arranged in rows and columns. In accordance with some embodiments, the indentations 150 may be arranged in multiple concentric circles. In accordance with some embodiments, the indentations 150 may be randomly distributed on the backside surface 102 of the substrate 100.

Figure 7:
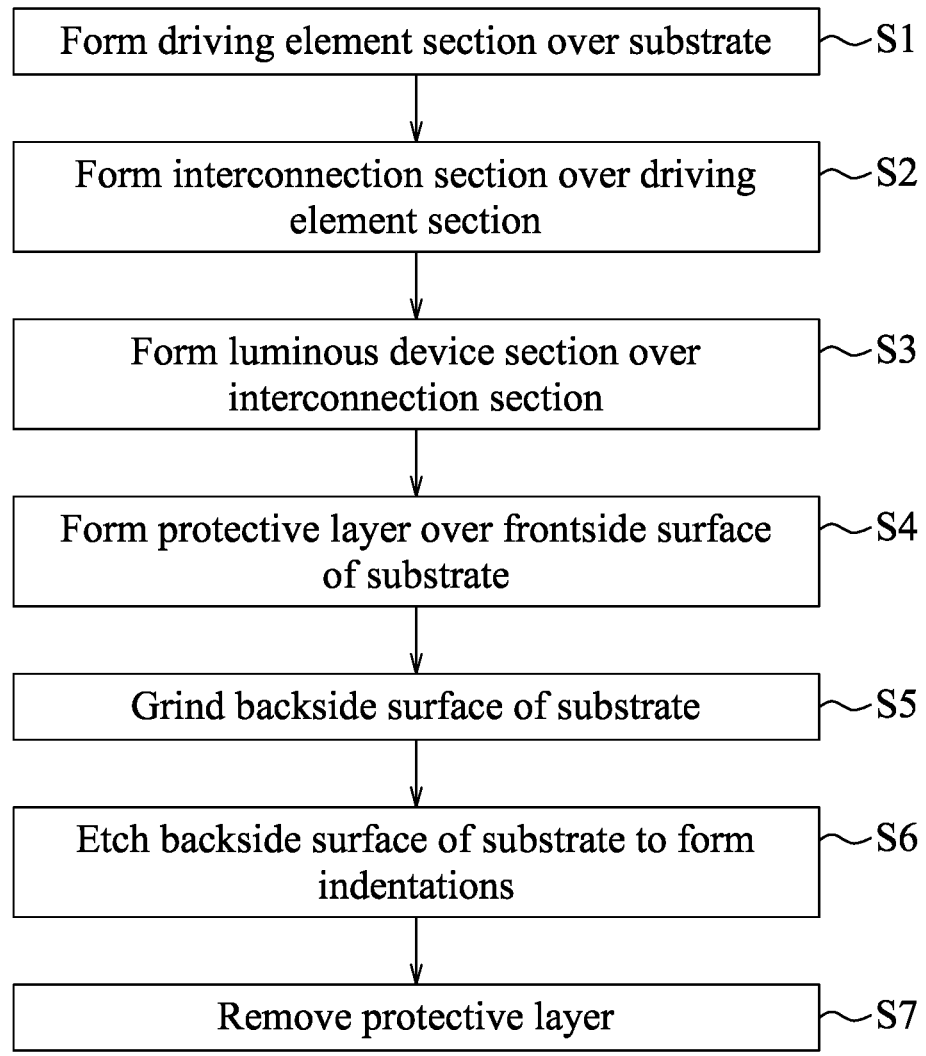
FIG. 7 is a flow chart that illustrates steps for forming the curved display device in accordance with some embodiments.

FIG. 7 is a flow chart that cooperates with FIGS. 8 through 16 to illustrate a process for fabricating the curved display device 1B as exemplified in FIG. 4 in accordance with some embodiments.

Figure 8:
FIGS. 8 through 11 and FIGS. 13 thorough 16 are sectional views that cooperate with FIG. 7 to illustrate steps for forming the curved display device in accordance with some embodiments.

Referring to FIG. 8, the substrate 100 is provided. In the illustrative embodiment, the substrate 100 is a semiconductor wafer (e.g., a silicon wafer) that may be formed with functional elements (e.g., resistors, capacitors, diodes, transistors, and/or the like) therein.

Figure 9:
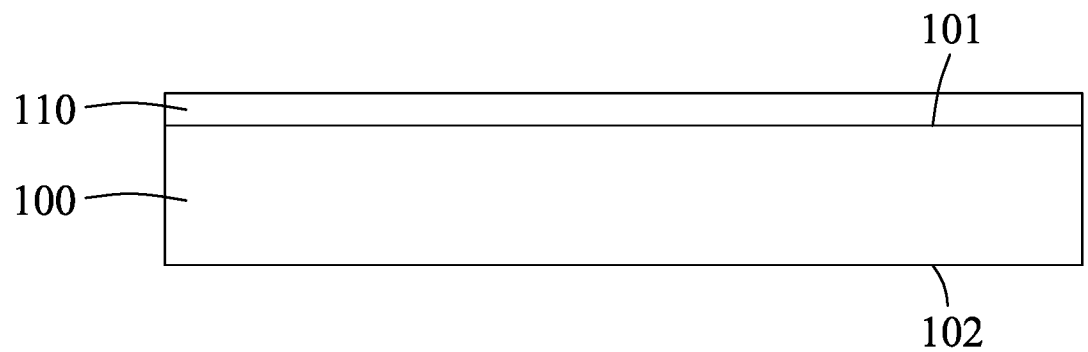

Referring to FIGS. 7 and 9, in step S1, the driving element section 110 is formed over the frontside surface 101 of the substrate 100. The driving element section 110 may include a plurality of pixel-driving components 112 (see FIG. 3) to drive light emission of the luminous pixels 12 (see FIG. 3), and peripheral circuits (e.g., the gate driver circuits, the source driver circuits, the wire routing, etc.) that are formed in the peripheral circuit area 20 (see FIG. 1) to drive operation of the pixel-driving components 112. For example, the wire routing may include routing of gate lines that extend in a row direction and routing of data lines that extend in a column direction; the gate driver circuits may turn on the pixel-driving components 112 row by row through the gate lines; and the source driver circuits send image data through the data lines to a row of the pixel-driving components 112 that is turned on by the gate driver circuits. The operations of the peripheral circuits should be familiar to one having ordinary skill in the art, so details thereof are omitted herein for the sake of brevity.

Figure 10:
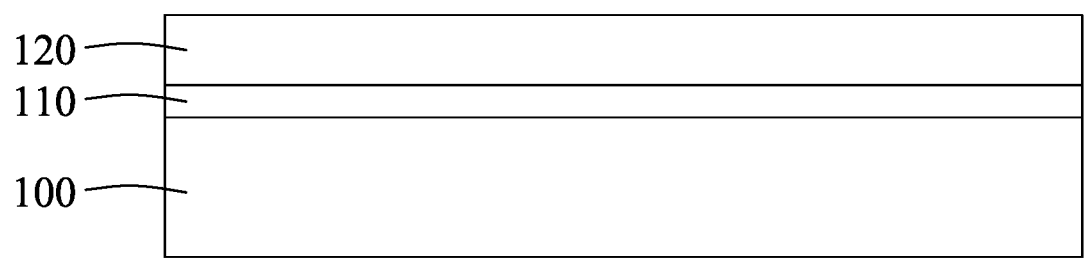

Referring to FIGS. 7 and 10, in step S2, the interconnection section 120 is formed over the driving element section 110. The interconnection section 120 may include multiple layers of interconnection structures (e.g., metal wires, metal vias, and the like) to electrically connect some circuit elements (e.g., the pixel-driving components 112) that are formed in lower sections (when viewed from the perspective of FIG. 10; e.g., the driving element section 110) to circuit elements (e.g., the luminous pixels 12 in FIG. 3) that are to be subsequently formed over the interconnection section 120.

Figure 11:
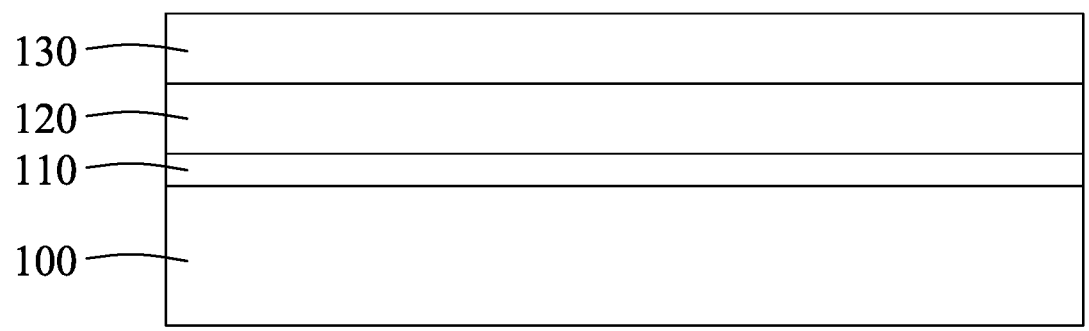
Figure 12:
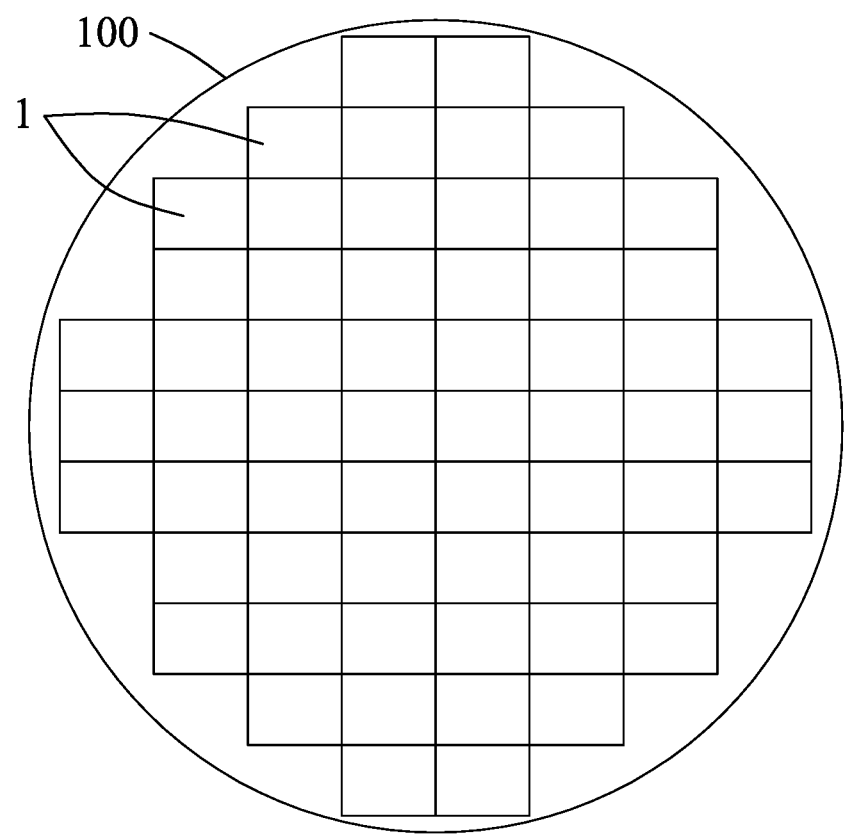
FIG. 12 is a schematic diagram that illustrates a top view of a wafer substrate formed with a plurality of display devices in accordance with some embodiments.

Referring to FIGS. 3, 7 and 11, in step S3, the luminous device section 130 is formed over the interconnection section 120. The luminous pixels 12 formed in the luminous device section 130 are electrically connected to the pixel-driving components 112 through the interconnection structures of the interconnection section 120. At this stage, the substrate 100 has been formed with a plurality of the display devices 1, as exemplified in FIG. 12, where the display devices 1 are flat display devices 1A as exemplified in FIG. 3. In practice, a number of the display devices 1 may be either less or more than what is depicted in FIG. 12, and may be determined based on the demand and/or design layout, and the disclosure is not limited thereto.

Figure 13:
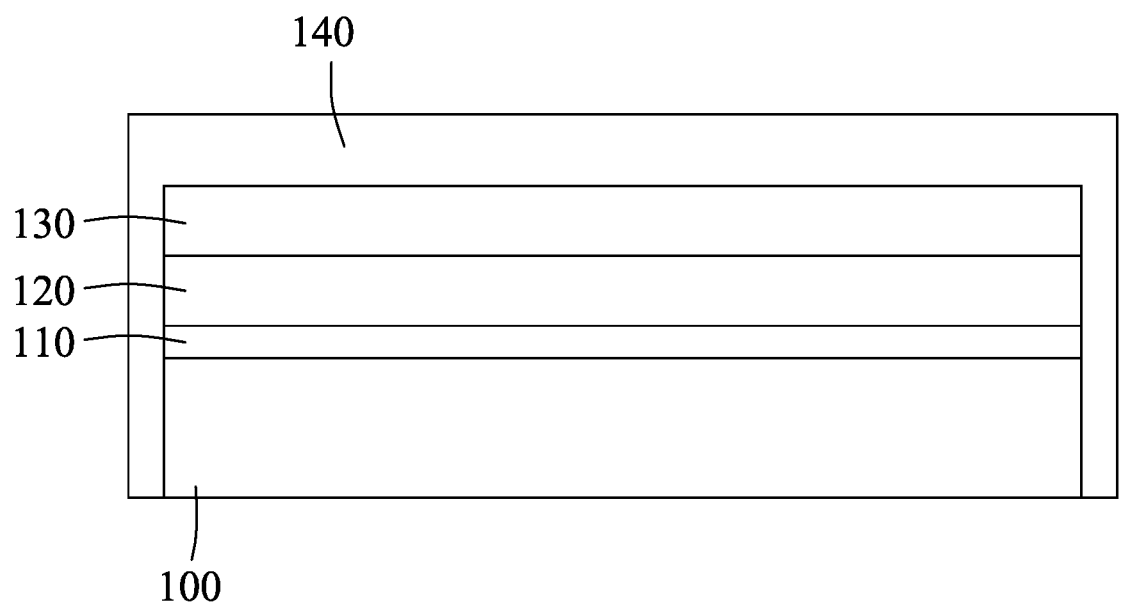

Referring to FIGS. 7 and 13, in step S4, a protective layer 140 is formed over the luminous device section 130 to cover the luminous pixels 12 (see FIGS. 1 and 3). In accordance with some embodiments, the protective layer 140 may include, for example, a polymer, silicon nitride, other suitable materials, or any combination thereof. In accordance with some embodiments, a protective polymer layer may be formed using, for example, spin coating, followed by a baking process that has a baking temperature in a range from about 85° C. to about 500° C. An excessively low baking temperature (e.g., lower than 85° C.) may not achieve effective drying of the polymer, while an excessively high baking temperature (e.g., higher than 500° C.) may affect distribution of implants that have been implanted in the front-end-of-line (FEOL) process, resulting in shifting of device characteristics (e.g., threshold voltage of transistors). Using the polymer as the protective layer 140 is advantageous in that the spin coating process is a process of low cost, high stability, low process temperature (can be performed under room temperature), and low pollution risk and does not require a vacuum environment. In accordance with some embodiments, a protective silicon nitride layer may be formed using, for example, chemical vapor deposition (CVD), other suitable deposition techniques, or any combination thereof. In accordance with some embodiments, a CVD process to form the protective silicon nitride layer may have a process temperature in a range from about 200° C. to about 500° C. An excessively low CVD process temperature (e.g., lower than 200° C.) maybe insufficient to form the silicon nitride layer with desired properties, while an excessively high CVD process temperature (e.g., higher than 500° C.) may affect distribution of implants that have been implanted in the FEOL process, resulting in shifting of device characteristics. In accordance with some embodiments, the protective layer 140 may have a thickness in a range from about 50 nm to about 100 μm. An excessively small thickness of the protective layer 140 (e.g., smaller than 50 nm) may be insufficient to protect the luminous device section 130 from damages in subsequent processes, while an excessively large thickness of the protective layer 140 (e.g., greater than 100 μm) may result in a longer process time (e.g., time for baking the polymer, time for removing the protective layer 140 in a later process, etc.), which is less economic. In accordance with some embodiments, during a coating process or a deposition process for forming the protective layer 140, the protective layer 140 may also be formed on a lateral side of the substrate 100, but this disclosure is not limited in this respect.

Figure 14:
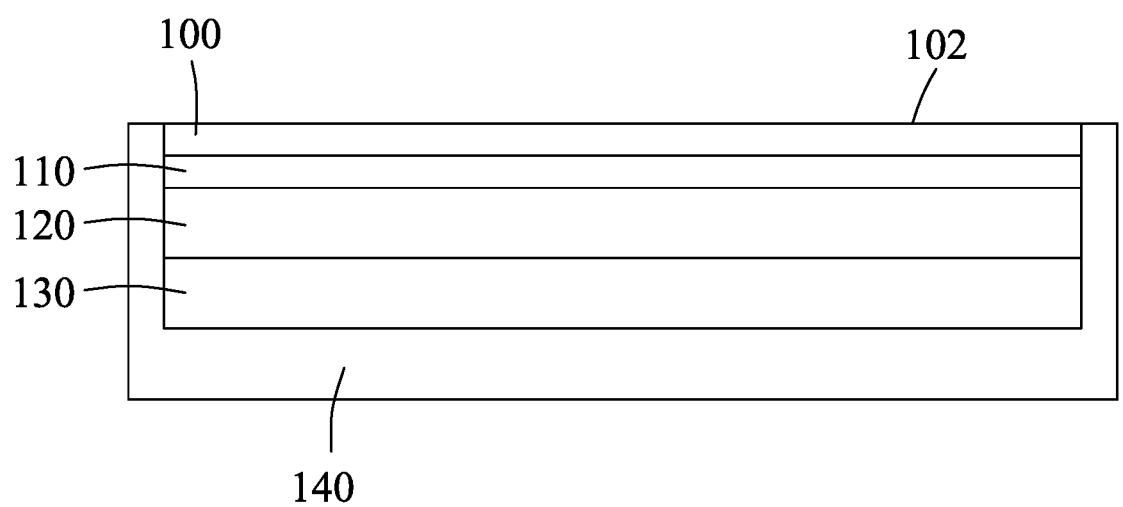

Referring to FIGS. 7 and 14, in step S5, the substrate 100 is flipped, and the backside surface 102 of the substrate 100 is ground to reduce a thickness of the substrate 100, so the substrate 100 may bend more easily or have a greater curvature after the indentations 150 (see FIG. 5) are formed in a subsequent process. In accordance with some embodiments, the grinding of the substrate 100 may be performed using a chemical mechanical planarization (CMP) process, other suitable processes, or any combination thereof. The grinding process may generate some particles or pollutions that may cause damages to structures formed at the frontside of the substrate 100. However, the protective layer 140 can protect the luminous device section 130 from being damaged in the grinding process. In accordance with some embodiments, the substrate 100 is ground to a thickness in a range from about 10 μm to about 300 μm. An excessively small thickness of the substrate 100 (e.g., smaller than 10 μm) may result in an insufficient mechanical strength of the substrate 100, and thus the substrate 100 may be easily damaged or may crack. An excessively large thickness of the substrate 100 (e.g., greater than 300 μm) may make the substrate 100 unable to achieve a desired curvature.

Figure 15:
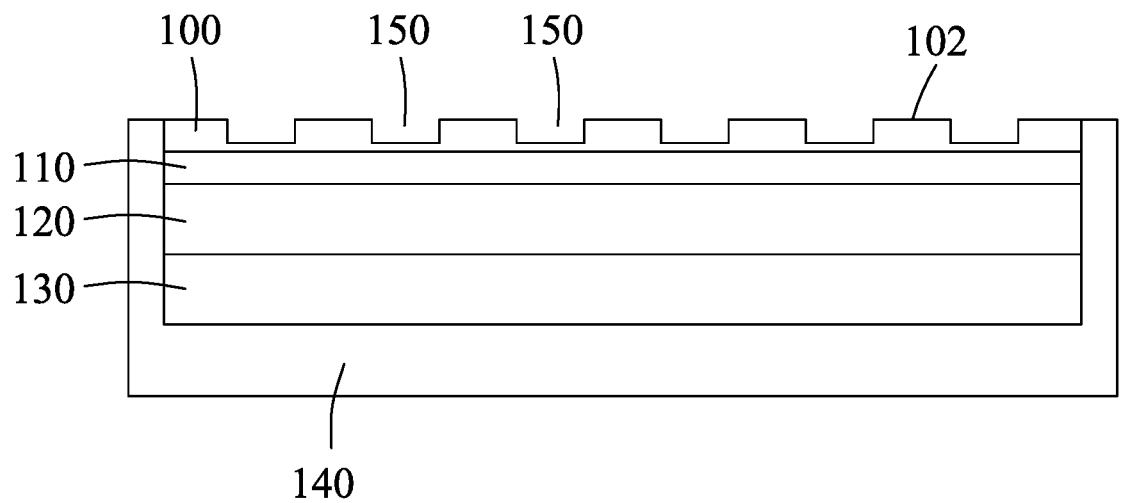

Referring to FIGS. 7 and 15, in step S6, the backside surface 102 of the substrate 100 is etched to formed the indentations 150 therein. In accordance with some embodiments, the indentations 150 may be formed using a photolithography process. In detail, a photoresist layer may be formed over the backside surface 102 of the substrate 100 using, for example, spin coating, followed by a baking process. Then, an exposure process is performed using a reticle/photomask that is formed with a plurality of indentation patterns (e.g., stripe patterns, cross patterns, square patterns, triangle patterns, hexagram patterns, circle patterns, and/or oval patterns, etc.), followed by a developing process. After the developing process, an etching process is performed using, for example, dry etching, wet etching, other suitable etching techniques, or any combination thereof, to form the indentations 150 in the backside surface 102 of the substrate 100. In accordance with some embodiments, each of the indentations 150 is formed to have a depth in a range from about 3 μm to about 60 μm. The depths of the indentations 150 may be used to adjust the curvature of the resultant display device 1, where a deeper indentation may lead to a greater curvature. Excessively small depths of the indentations 150 (e.g., smaller than 3 μm) may be insufficient to achieve the desired curvature of the substrate 100, while excessively large depths of the indentations 150 (e.g., greater than 60 μm) may reduce the mechanical strength of the substrate 100 excessively, and thus the substrate 100 may easily crack. The indentations 150 may have either the same or different depths. In accordance with some embodiments, an annealing process may be performed after the indentations 150 are formed, so as to enhance the curvature of the resultant display device 1 (see FIG. 4). The annealing process may have an annealing temperature in a range from about 300° C. to about 500° C. An excessively low annealing temperature (e.g., lower than 300° C.) may be insufficient to enhance the curvature of the resultant display device 1. An excessively high annealing temperature (e.g., greater than 500° C.) may affect distribution of implants that have been implanted in the front-end-of-line (FEOL) process, resulting in shifting of device characteristics. After the etching process, the photoresist layer is removed using, for example, 02 plasma ashing and wet strip, so as to reveal the patterned backside surface 102 of the substrate 100 (i.e., the backside surface 102 that is formed with the indentations 150).

Figure 16:
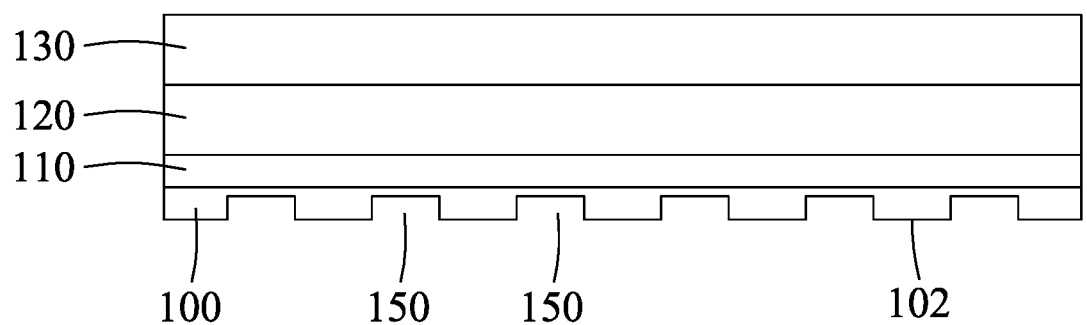
Figure 17:
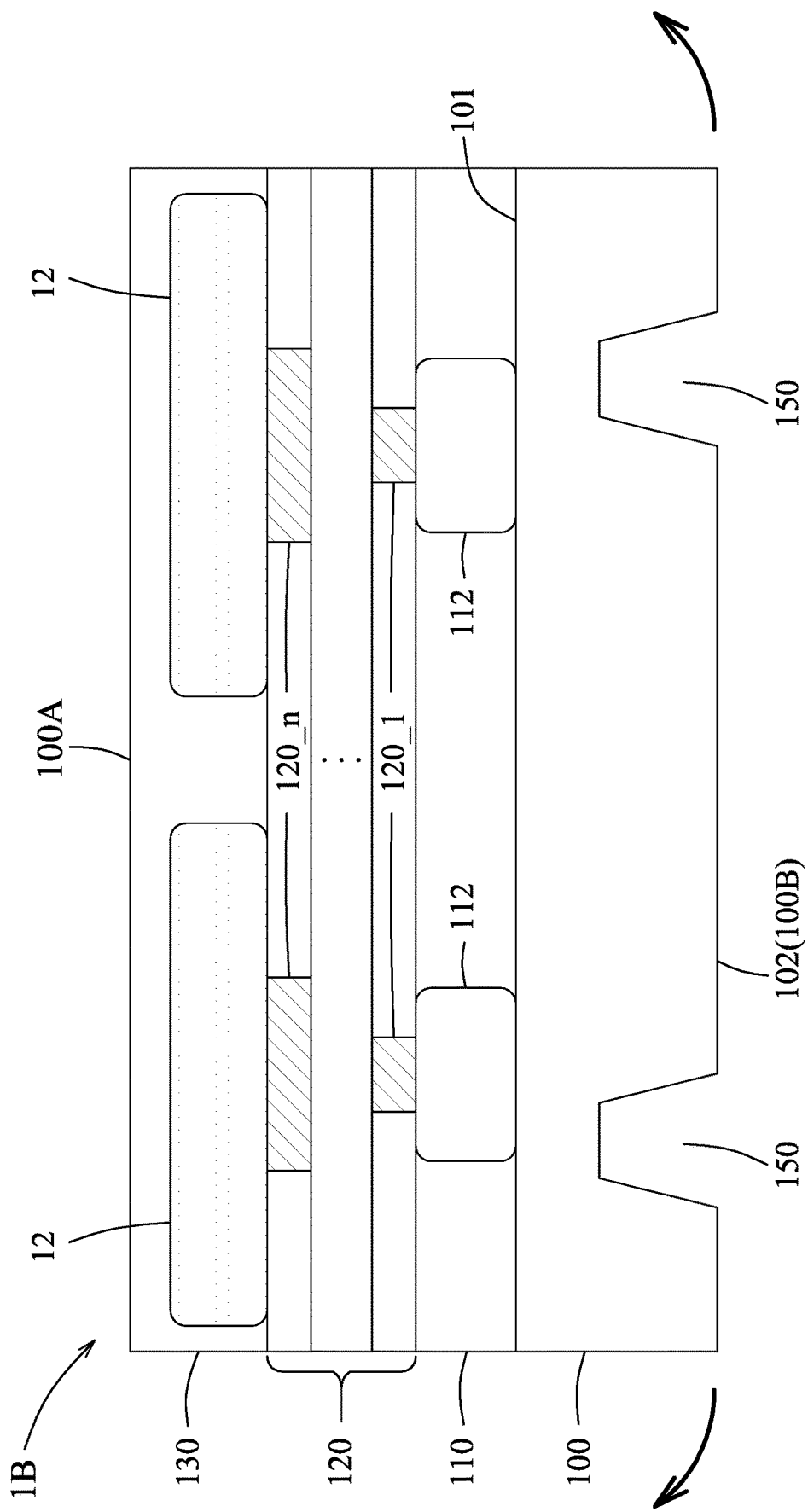
FIG. 17 is a sectional view of the curved display device in accordance with some embodiments.

Referring to FIGS. 7, 16 and 17, in step S7, the protective layer 140 is removed from the substrate 100. As a result, the substrate 100 is formed with a plurality of display devices that have structures of the curved display devices 1B (i.e., the display devices 1 in FIG. 12 have the structures of the curved display device 1B at the current stage). In accordance with some embodiments, the protective layer 140 may be removed using, for example, dry etching, other suitable etching techniques, or any combination thereof. In accordance with some embodiments where the protective layer 140 is transparent, step S7 may be omitted. However, the curved display device 1B may have a better image quality with the protective layer 140 removed. Then, the substrate 100 is cut to separate the display devices 1 formed on the substrate 100, and the display devices 1 will naturally bend toward the frontside direction by virtue of the indentations 150 that are formed in the backside surface 102 of the substrate 100, thereby obtaining multiple pieces of the curved display devices 1B.

FIG. 17 exemplarily illustrates a simplified sectional structure of the display area 10 of the curved display device 1B. Similar to the flat display device as exemplified in FIG. 3, the curved display device 1B includes the substrate 100, the driving element section 110 formed over the frontside surface 101 of the substrate 100, the interconnection section 120 formed over the driving element section 110, and the luminous device section 130 formed over the interconnection section 120, where the luminous pixels 12 are formed in the luminous device section 120. Specifically, the substrate 100 of the curved display device 1B is curved, and the frontside surface 101 and the backside surface 102 thereof are curved surfaces, or particularly, a concave surface and a convex surface, respectively. In addition, the curved display device 1B has a plurality of indentations 150 formed in the backside surface 102 of the substrate 100. In FIG. 17, the indentations 150 are stripe-shaped indentations that extend in a direction entering the drawing, thereby making the substrate 100 bend in directions represented by curved arrows in FIG. 17 toward the frontside direction (an upper direction in FIG. 17) from two sides separated by the direction in which the stripe-shaped indentations extend.

Figure 18:
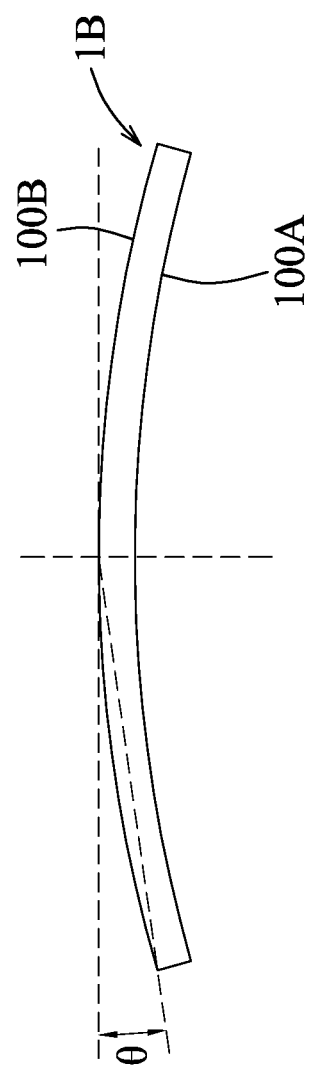
FIG. 18 is a schematic diagram that illustrates a curvature of the curved display device in accordance with some embodiments.

Referring to FIG. 18, a curvature of the curved display device 1B is defined by an angle θ between a tangent line that passes a center of the backside surface 100B and a straight line that interconnects the center of the backside surface 100B and an end of the backside surface 100B. In accordance with some embodiments, the angle θ of the curved display device 1B may range from about 0.9 degrees to about 15 degrees. An excessively small angle θ (e.g., smaller than 0.9 degrees) may be insufficient to effectively alleviate the distortion that may occur at the edge portion of the image displayed by the display device 1. An excessively large angle θ (e.g., greater than 15 degrees) may make the substrate 100 easily crackable, resulting in low yield in mass production.

In accordance with some embodiments, a display device is provided for use in a near-eye display. The display device includes a semiconductor substrate and a plurality of luminous pixels. The semiconductor substrate has a first curved surface and a second curved surface opposite to each other. The luminous pixels are formed over the first curved surface of the semiconductor substrate, and cooperatively form a display area of the display device. The second curved surface of the semiconductor substrate is formed with a plurality of indentations at a portion that corresponds in position to the display area.

In accordance with some embodiments, some of the indentations are stripe-shaped indentations that have a length in a range from 3 μm to 60 μm.

In accordance with some embodiments, the stripe-shaped indentations have a width in a range from 3 μm to 60 μm.

In accordance with some embodiments, some of the indentations are cross-shaped indentations each having a first stripe pattern and a second stripe pattern that intersect each other. For each of the cross-shaped indentations, each of the first stripe pattern and the second stripe pattern has a length in a range from 3 μm to 60 μm.

In accordance with some embodiments, the semiconductor substrate has a thickness in a range from 10 μm to 300 μm.

In accordance with some embodiments, a distribution density of those of the indentations that correspond in position to an edge portion of the display area is greater than a distribution density of those of the indentations that correspond in position to a central portion of the display area.

In accordance with some embodiments, each of the indentations has a depth in a range from 3 μm to 60 μm.

In accordance with some embodiments, a method is provided for fabricating a display device for use in a near-eye display. In one step, a plurality of luminous pixels are formed over a first surface of a semiconductor substrate. The luminous pixels cooperatively form a display area of the display device. In one step, a plurality of indentations are formed in a second surface of the semiconductor substrate that is opposite to the first surface of the semiconductor substrate at a portion that corresponds in position to the display area.

In accordance with some embodiments, between the step of forming the luminous pixels and the step of forming the indentations, the second surface of the semiconductor substrate is ground to reduce a thickness of the semiconductor substrate.

In accordance with some embodiments, between the step of forming the luminous pixels and the step of grinding the second surface of the semiconductor substrate, a protective layer is formed over the luminous pixels.

In accordance with some embodiments, the step of forming the protective layer over the luminous pixels includes coating a polymer layer over the luminous pixels.

In accordance with some embodiments, after the step of forming the indentations, the protective layer is removed.

In accordance with some embodiments, in the step of grinding the second surface of the semiconductor substrate, the thickness of the semiconductor substrate is reduced to fall within a range from 10 μm to 300 μm.

In accordance with some embodiments, some of the indentations are stripe-shaped indentations each having a length in a range from 3 μm to 60 μm.

In accordance with some embodiments, some of the indentations are cross-shaped indentations each having a first stripe pattern and a second stripe pattern that intersect each other. For each of the cross-shaped indentations, each of the first stripe pattern and the second stripe pattern has a length in a range from 3 μm to 60 μm.

In accordance with some embodiments, each of the indentations has a depth in a range from 3 μm to 60 μm.

In accordance with some embodiments, in the step of forming the indentations, a distribution density of those of the indentations that correspond in position to an edge portion of the display area is greater than a distribution density of those of the indentations that correspond in position to a central portion of the display area.

In accordance with some embodiments, a display device is provided for use in a near-eye display. The display device includes a curved semiconductor substrate, a driving element section and a luminous device section. The curved semiconductor substrate has a concave first surface and a convex second surface opposite to each other. The driving element section includes a plurality of pixel-driving components formed therein and is disposed over the concave first surface of the semiconductor substrate. The luminous device section includes a plurality of luminous pixels formed therein. The luminous pixels are electrically connected to and driven by the pixel-driving components to emit light. The convex second surface of the semiconductor substrate has a plurality of indentations formed therein at a portion that corresponds in position to a portion of the luminous device section where the luminous pixels are formed.

In accordance with some embodiments, the semiconductor substrate has a thickness in a range from 10 μm to 300 μm.

In accordance with some embodiments, each of the indentations has a depth in a range from 3 μm to 60 μm.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device for use in a near-eye display, comprising:
    a semiconductor substrate that has a first curved surface and a second curved surface opposite to each other; and
    a plurality of luminous pixels that are formed over the first curved surface of the semiconductor substrate, and that cooperatively form a display area of the display device;
    wherein the second curved surface of the semiconductor substrate is formed with a plurality of indentations at a portion that corresponds in position to the display area.

2. The display device according to claim 1, wherein some of the indentations are stripe-shaped indentations that have a length in a range from 3 μm to 60 μm.

3. The display device according to claim 2, wherein the stripe-shaped indentations have a width in a range from 3 μm to 60 μm.

4. The display device according to claim 1, wherein some of the indentations are cross-shaped indentations each having a first stripe pattern and a second stripe pattern that intersect each other; and
    wherein, for each of the cross-shaped indentations, each of the first stripe pattern and the second stripe pattern has a length in a range from 3 μm to 60 μm.

5. The display device according to claim 1, wherein the semiconductor substrate has a thickness in a range from 10 μm to 300 μm.

6. The display device according to claim 1, wherein a distribution density of those of the indentations that correspond in position to an edge portion of the display area is greater than a distribution density of those of the indentations that correspond in position to a central portion of the display area.

7. The display device according to claim 1, wherein each of the indentations has a depth in a range from 3 μm to 60 μm.

8. A method for fabricating a display device for use in a near-eye display, comprising steps of:
    forming a plurality of luminous pixels over a first surface of a semiconductor substrate, the luminous pixels cooperatively forming a display area of the display device; and
    forming a plurality of indentations in a second surface of the semiconductor substrate that is opposite to the first surface of the semiconductor substrate at a portion that corresponds in position to the display area.

9. The method according to claim 8, further comprising, between the step of forming the luminous pixels and the step of forming the indentations, a step of grinding the second surface of the semiconductor substrate to reduce a thickness of the semiconductor substrate.

10. The method according to claim 9, further comprising, between the step of forming the luminous pixels and the step of grinding the second surface of the semiconductor substrate, a step of forming a protective layer over the luminous pixels.

11. The method according to claim 10, wherein the step of forming the protective layer over the luminous pixels includes coating a polymer layer over the luminous pixels.

12. The method according to claim 10, further comprising, after the step of forming the indentations, a step of removing the protective layer.

13. The method according to claim 9, wherein, in the step of grinding the second surface of the semiconductor substrate, the thickness of the semiconductor substrate is reduced to fall within a range from 10 μm to 300 μm.

14. The method according to claim 8, wherein some of the indentations are stripe-shaped indentations each having a length in a range from 3 μm to 60 μm.

15. The method according to claim 8, wherein some of the indentations are cross-shaped indentations each having a first stripe pattern and a second stripe pattern that intersect each other; and
    wherein, for each of the cross-shaped indentations, each of the first stripe pattern and the second stripe pattern has a length in a range from 3 μm to 60 μm.

16. The method according to claim 8, wherein each of the indentations has a depth in a range from 3 μm to 60 μm.

17. The method according to claim 8, wherein, in the step of forming the indentations, a distribution density of those of the indentations that correspond in position to an edge portion of the display area is greater than a distribution density of those of the indentations that correspond in position to a central portion of the display area.

18. A display device for use in a near-eye display, comprising:
- a curved semiconductor substrate that has a concave first surface and a convex second surface opposite to each other;
- a driving element section that includes a plurality of pixel-driving components formed therein and that is disposed over the concave first surface of the semiconductor substrate; and
- a luminous device section that includes a plurality of luminous pixels formed therein, the luminous pixels being electrically connected to and driven by the pixel-driving components to emit light;
- wherein the convex second surface of the semiconductor substrate has a plurality of indentations formed therein at a portion that corresponds in position to a portion of the luminous device section where the luminous pixels are formed.

19. The display device according to claim 18, wherein the semiconductor substrate has a thickness in a range from 10 μm to 300 μm.

20. The display device according to claim 19, wherein each of the indentations has a depth in a range from 3 μm to 60 μm.

* * * * *